(12) United States Patent
Hirata et al.

(10) Patent No.: US 7,499,253 B2
(45) Date of Patent: Mar. 3, 2009

(54) SEMICONDUCTOR INTEGRATED-CIRCUIT UNIT WITH TEMPERATURE PROTECTIVE CIRCUIT

(75) Inventors: Shigeru Hirata, Kyoto (JP); Masanori Tsuchihashi, Kyoto (JP); Kazuhiro Murakami, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 253 days.

(21) Appl. No.: 11/370,619

(22) Filed: Mar. 7, 2006

(65) Prior Publication Data

US 2006/0198074 A1    Sep. 7, 2006

(30) Foreign Application Priority Data

Mar. 7, 2005    (JP) .............................. 2005-062163

(51) Int. Cl.
*H02H 5/04* (2006.01)
(52) U.S. Cl. ...................................... 361/103; 361/93.8
(58) Field of Classification Search ................ 361/93.7, 361/93.8, 93.9, 103, 23
See application file for complete search history.

(56) References Cited

U.S. PATENT DOCUMENTS 6,366,153 B1 *    4/2002    Arslain et al. ................ 327/512

FOREIGN PATENT DOCUMENTS

| JP | 61-127156 | 6/1986 |
|----|-----------|--------|
| JP | 07-161920 | 6/1995 |
| JP | 09-246876 | 9/1997 |
| JP | 2004-253936 | 9/2004 |

* cited by examiner

*Primary Examiner*—Danny Nguyen
(74) *Attorney, Agent, or Firm*—Fish & Richardson P.C.

(57) ABSTRACT

A temperature protective circuit of the semiconductor integrated circuit unit of the present invention is configured such that the circuit includes a heat generation detecting section for detecting a monitored temperature and a limiting signal producing section for limiting continuously or stepwise the drive of a load (for example, the upper limit of drive current) according to the above-mentioned monitored temperature, after the above-mentioned monitored temperature exceeds a first threshold temperature, based on the detection results of the above-mentioned heat generation detecting section. With such a configuration, an abnormal heat generation of a subject of overheat monitoring can be previously limited to perform a more safely temperature protective operation.

11 Claims, 7 Drawing Sheets

SEMICONDUCTOR INTEGRATED-CIRCUIT UNIT WITH TEMPERATURE PROTECTIVE CIRCUIT

CROSS-REFERENCE TO THE RELATED APPLICATION

This application is based on Japanese Patent Application No. 2005-062163 filed on Mar. 7, 2005 the contents of which are hereby incorporated by reference.

BACKGROUND OF THE INVENTION

1. Field of the Invention

The present invention relates to a semiconductor integrated circuit unit having a temperature protective circuit, and more particularly, to an improvement of the accuracy of the temperature protective function thereof.

2. Description of the Prior Art

Heretofore, many of semiconductor integrated-circuit units (hereinafter, called the IC (Integrated Circuit)) for driving a power transistor such as a power source device and a motor drive device are provided with a temperature protective circuit (so-called thermal shut-down circuit) as a means of preventing the IC from being broken due to an abnormal heat generation (especially, destruction of the power transistor generating the heat) (for example, refer to Japanese Laid-Open Patent No. 2004-253936 and Japanese Patent Publication No. H06-16540 by the applicant of the application).

Further, the conventional temperature protective circuit generally has been configured to produce a temperature protective signal by utilizing characteristics in that the Vf (forward dropping voltage) of a bipolar transistor or a diode fluctuates depending on the ambient temperature thereof Further, the conventional temperature protective circuit generally has been of an automatic reset type having a hysteresis in threshold temperatures.

Other than above, as a conventional art in connection with the present invention, there have been disclosed and proposed a protective circuit in which a temperature protective circuit and an overcurrent protective circuit use a standard voltage generation section or an output section in common (refer to Japanese Laid-Open Patent No. H09-246876), and a semiconductor integrated-circuit for enhancing the drive current ability when a low temperature is detected (refer to Japanese Laid-Open Patent No. H07-161920).

Certainly, the conventional temperature protective circuit described above can detect and shut down an abnormal heat generation of the IC due to malfunction or overload, and thus prevent previously the breakage of the IC.

However, the conventional temperature protective circuit described above has a configuration such that the drive of a principal IC section is not stopped until the chip temperature reaches the threshold temperature, that is, an abnormal heat generation is detected, thus a preliminary temperature protective operation before the detection of abnormal heat generation being not particularly considered. For example, in the motor drive IC provided with the conventional temperature protective circuit, even if the indication of abnormal temperature rise is found, a torque control not different from regular operation is continuously performed unless the chip temperature reaches the threshold temperature. Hence, the conventional temperature protective circuit has a problem in that the circuit, even though finally can shut down the abnormal heat generation of the IC, cannot prevent the generation, thereby making the chip temperature easily increased.

Further, an IC provided with the conventional temperature protective circuit has a problem in that the output thereof is sharply turned off due to the shut-down operation at the abnormal heat generation, whereby various discrepant conditions (noise or serge generation) are apt to be introduced. For example, in a case where a subject of the IC to be driven is an L load having inductance components (such as motor coil), a counter-electromotive voltage developed in the L load concerned is jumped at the shut-down of the IC to exceed the withstand voltage thereof, whereby the IC can be broken.

Further, the conventional temperature protective circuit is often provided near a subject of overheat monitoring in order to improve the sensibility of the detection of abnormal heat generation. On the contrary, as a compensation, because the logic states (high level/low level) of the temperature protective signal are highly frequently repeated even though the threshold temperature is given the above-mentioned hysteresis, the automatic restart operation after shut-down can be in a state (logic oscillating state) in which the operation cannot be released from that state.

SUMMARY OF THE INVENTION

In view of the above-mentioned problems, an object of the present invention is to provide a semiconductor integrated circuit unit capable of limiting previously an abnormal heat generation in a subject of overheat monitoring, and performing a temperature protective operation with a higher safety.

In order to achieve the above-mentioned object, the semiconductor integrated-circuit unit in connection with the present invention is configured to have a temperature protective circuit for detecting an abnormal heat generation of the unit to perform a temperature protective operation, and the above-mentioned temperature protective circuit is configured such that the circuit includes a heat generation detecting section for detecting a monitored temperature and a limiting signal producing section for limiting continuously or stepwise the drive of a load (for example, the upper limit of drive current) according to the above-mentioned monitored temperature, after the above-mentioned monitored temperature exceeds a first threshold temperature, based on the detection results of the above-mentioned heat generation detecting section.

DESCRIPTION OF THE PREFERRED EMBODIMENTS

Hereinafter, a motor deriver IC as a semiconductor integrated-circuit unit according to the present invention will be illustrated and explained in detail.

Figure 1:
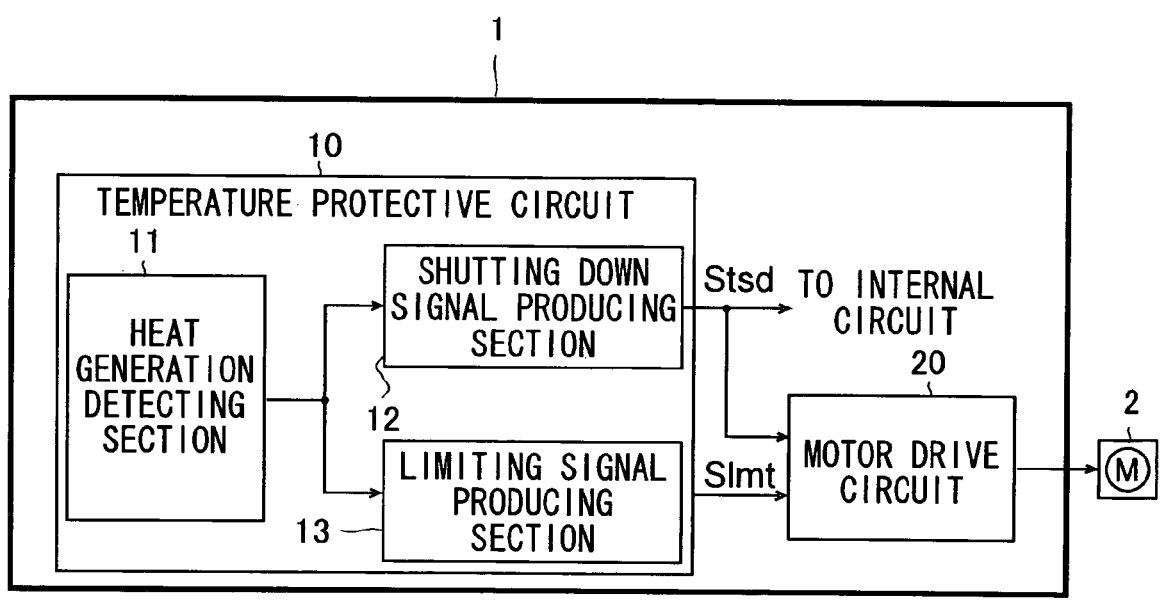
FIG. 1 is a schematic block diagram showing a motor driver IC in connection with the present invention.

FIG. 1 is a block diagram showing a schematic configuration of a motor driver IC 1 of the present invention. As shown in this figure, the motor driver IC 1 is configured such that the IC contains a temperature protective circuit 10 for detecting an abnormal heat generation thereof and shutting down the IC to prevent previously the IC from being broken, and a motor drive circuit 20 for driving a motor 2 by open/close controlling a power transistor constituting an output stage.

The temperature protective circuit 10 is a means, as the basic function thereof, for producing a shutting down signal Stsd to stop the drive of the motor driver IC 1 if an abnormal heat generation occurs. The shutting down signal Stsd is a binary signal which is asserted (for example, high-level transited) when an abnormal heat generation occurs, and negated (for example, low-level transited) when an abnormal heat generation does not occur.

The above-mentioned shutting down signal Stsd is outputted to an internal circuit not shown or to the motor drive circuit 20 to be utilized for the shut down control when an abnormal heat generation occurs. That is, a post-step circuit having received the input of the shutting down signal Stsd from the temperature protective circuit 10 recognizes whether the abnormal heat generation occurs or not according to the assert/negate thereof, thereby allowing the inhibition/authorization of the internal operation to be controlled.

The provision of such a temperature protective circuit 10 allows the breakage of the motor driver IC 1 (particularly, the breakage of the power transistor constituting the motor drive circuit 20) due to the abnormal heat generation to be previously prevented.

Further, the temperature protective circuit 10 is provided near the motor drive circuit 20 (particularly, the power transistor thereof) which is a subject of overheat monitoring. With such a configuration, the junction temperature of the power transistor as a heat generating source can be directly detected, thereby realizing a highly-accurate temperature protective operation.

Further, the temperature protective circuit 10 has been of an automatic restart type having a hysteresis in threshold temperatures. With such a configuration, when the chip temperature drops, the drive of the principal IC section (the drive of the motor 2 by the motor drive circuit 20, and the like) can be spontaneously restarted without waiting for a restart signal from the outside. Further, with a configuration having a hysteresis in threshold temperatures, the logic oscillation of the shutting down signal Stsd can be limited to some extent.

Now, the above-mentioned shutting down signal Stsd, as described above, is a signal such that the drive of principal IC section is not stopped until the chip temperature reaches the threshold temperature, that is, an abnormal heat generation is detected, thus does not carry the temperature protective operation before the abnormal heat generation is detected. Hence, only using the shutting down signal Stsd concerned cannot prevent the abnormal heat generation of the IC.

Further, since a subject of the motor driver IC 1 to drive is an L load having inductance components (such as motor coil), when only using the shutting down signal Stsd, a counter-electromotive voltage developed in the L load is jumped due to a sharp shut-down of the IC output at the abnormal heat generation, whereby a breakage of the motor driver IC 1 can be caused.

Further, with the temperature protective circuit 10 provided near the motor drive circuit 20, the sensibility of detecting an abnormal heat generation can be enhanced, but, on the contrary, with respect to the automatic restart operation of the temperature protective circuit 10, even though the threshold temperature is given hysteresis, the shutting down signal Stsd can be apt to be in a logic oscillating state.

Now, the temperature protective circuit 10 of the present invention is configured such that the circuit has the heat generation detecting section 11 and the shutting down signal producing section 12, as well as the limiting signal producing section 13 for producing a limiting signal Slmt to limit continuously (or stepwise) the drive of a principal IC section (particularly, the motor drive circuit 20) according to the temperature rise of the subject of overheat monitoring in order to limit previously the abnormal heat generation in the subject of overheat monitoring, and perform a temperature protective operation with a higher safety.

Hereinafter, the preliminary temperature protective operation using the above-mentioned limiting signal Slmt will be explained more specifically and in detail.

Figure 2:
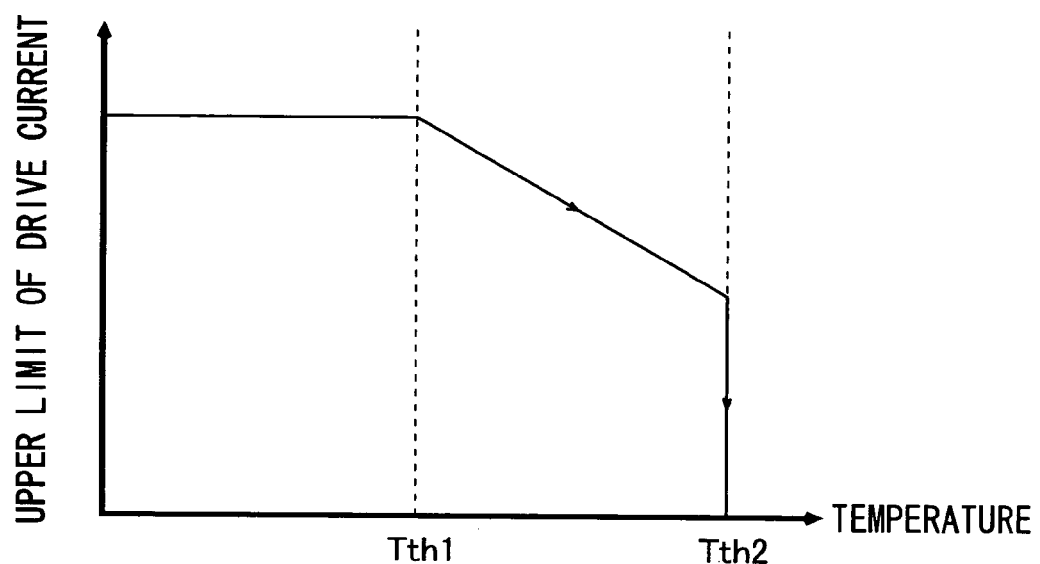
FIG. 2 is a graph showing an example of a preliminary temperature protective operation.

FIG. 2 is a graph showing an example of a preliminary temperature protective operation. As shown in this graph, the temperature protective circuit 10 of this example is configured such that with the circuit using the limiting signal Slmt, the drive of the motor drive circuit 20 is limited continuously (or stepwise) according to the above-mentioned monitored temperature, after the monitored temperature by the heat generation detecting section 11 exceeds a first threshold temperature Tth1 (for example, a maximum absolute rated temperature or a safety temperature lower than the temperature).

Describing more specifically, the temperature protective circuit 10 of this example is configured such that the circuit gradually limits the upper limit of the drive current supplied to the motor drive circuit 20 as the monitored temperature rises, after the monitored temperature exceeds the first threshold temperature Tth1. With such a configuration, an abnormal heat generation of the subject of overheat monitoring can be previously limited to perform a more-safety temperature protective operation. Further, even with the shut-down operation at abnormal heat generation described later, a sharply turned-off of the output is eliminated, whereby various discrepant conditions (noise or serge generation) can be avoided to safely stop the drive of the principal IC section.

Further, the temperature protective circuit 10 of this example is configured such that with the circuit using the shutting down signal Stsd, the drive of the motor drive circuit 20 is safely shut down at a time when the monitored temperature reaches a second threshold temperature Tth2 (for example, 175° C.) higher than the first threshold temperature Tth1. With such a configuration, if an abnormal temperature rise continues even when using the limiting control of the drive current by the limiting signal Slmt, the drive of the motor drive circuit 20 can be completely shut down to prevent previously the IC breakage due to the abnormal heat generation.

Figure 3:
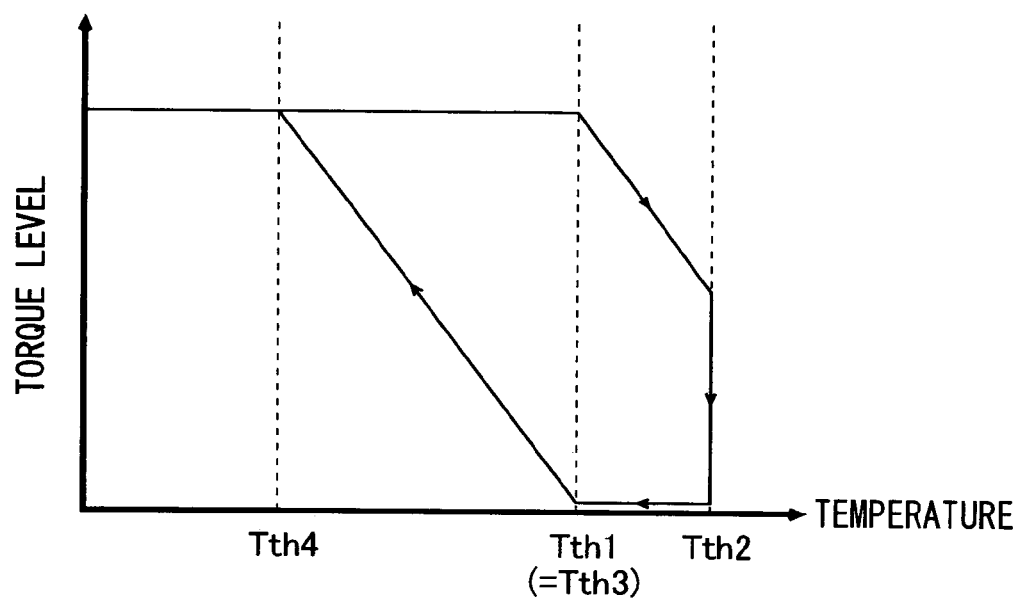
FIG. 3 is a graph showing another example of a preliminary temperature protective operation.

FIG. 3 is a graph showing another example of a preliminary temperature protective operation. As shown in this graph, the temperature protective circuit 10 of this example is configured such that the circuit gradually limits a torque level of the motor drive circuit 20 (that is, a drive duty of PWM (Pulse Width Modulation) control) as the monitored temperature rises, after the monitored temperature exceeds the first threshold temperature Tth1. With such a configuration, similarly to the configuration of performing the upper limit of the drive current, an abnormal heat generation of the subject of overheat monitoring can be previously limited to perform a more-safety temperature protective operation.

Further, similarly to the previous example, the temperature protective circuit 10 of this example also completely shuts down the drive of the motor drive circuit 20 at a time when the monitored temperature reaches the second threshold temperature Tth2. Therefore, if an abnormal temperature rise continues even when limiting the torque level, the drive of the motor drive circuit 20 can be completely shut down to prevent previously the IC breakage due to the abnormal heat generation.

Further, the temperature protective circuit 10 of this example is configured such that the circuit restarts the drive of the motor drive circuit 20 at a time when the monitored temperature reaches a third threshold temperature Tth3 (for example, 150° C.) lower than the second threshold temperature Tth2 after the drive of the motor drive circuit 20 is shut down. With such a configuration, when the monitored temperature lowers, the drive of the principal IC section can be rapidly and spontaneously restarted without waiting for a restart signal from the outside.

Furthermore, the temperature protective circuit 10 of this example is configured such that the circuit enhances continuously (or stepwise) the torque level of the motor drive circuit 20 according to the monitored temperature, after the monitored temperature becomes lower than the third threshold temperature Tth3. Further, the temperature protective circuit 10 of this example enhances the torque level so that the level becomes a steady state at a time when the monitored temperature reaches a fourth threshold temperature (for example, 100° C.). With such a configuration, the regeneration of heat after drive restart can be limited to perform a more-safety temperature protective operation. Also, the logic oscillation of the shutting down signal Stsd can be prevented. Although in this example, there has been shown a case where the first threshold temperature Tth1 and the third threshold temperature Tth3 are coincident with each other, such a setting of the threshold temperature is only illustrative and thus, may be changed as required.

Figure 4:
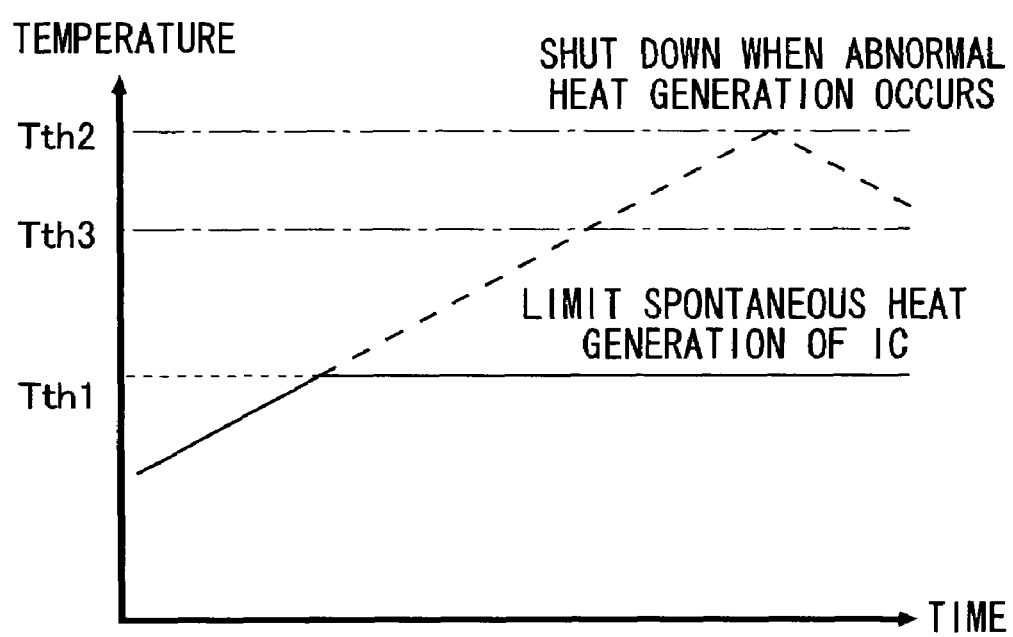
FIG. 4 is a graph showing another example of a preliminary temperature protective operation.

FIG. 4 is a graph showing still another example of a preliminary temperature protective operation. As shown in this graph, the temperature protective circuit 10 of this example is configured such that the circuit applies a feedback to the drive control (that is, the above-mentioned limit control of the drive current or the limit control of the torque level) of the motor drive circuit 20 so as to maintain the monitored temperature after the temperature reaches the first threshold temperature Tth1 when the first threshold temperature Tth1 is set at a value lower than the third threshold temperature Tth3. With such a configuration, before a situation is reached in which the drive of the motor drive circuit 20 must be completely shut down, the spontaneous heat generation of the motor driver IC 1 can be limited to realize a suitable preliminary temperature protective operation (refer to the solid line in the graph). On the other hand, if an abnormal heat generation occurs in the motor driver IC 1 even with the above-mentioned preliminary temperature protective operation, similarly to the previous example, at a time when the monitored temperature reaches the second threshold temperature Tth2, the drive of the motor drive circuit 20 can be completely shut down to prevent previously the IC breakage due to the abnormal heat generation (refer to the broken line in the graph).

Next, the configuration example and operation of the temperature protective circuit 10 will be explained more specifically and in detail.

Figure 5:
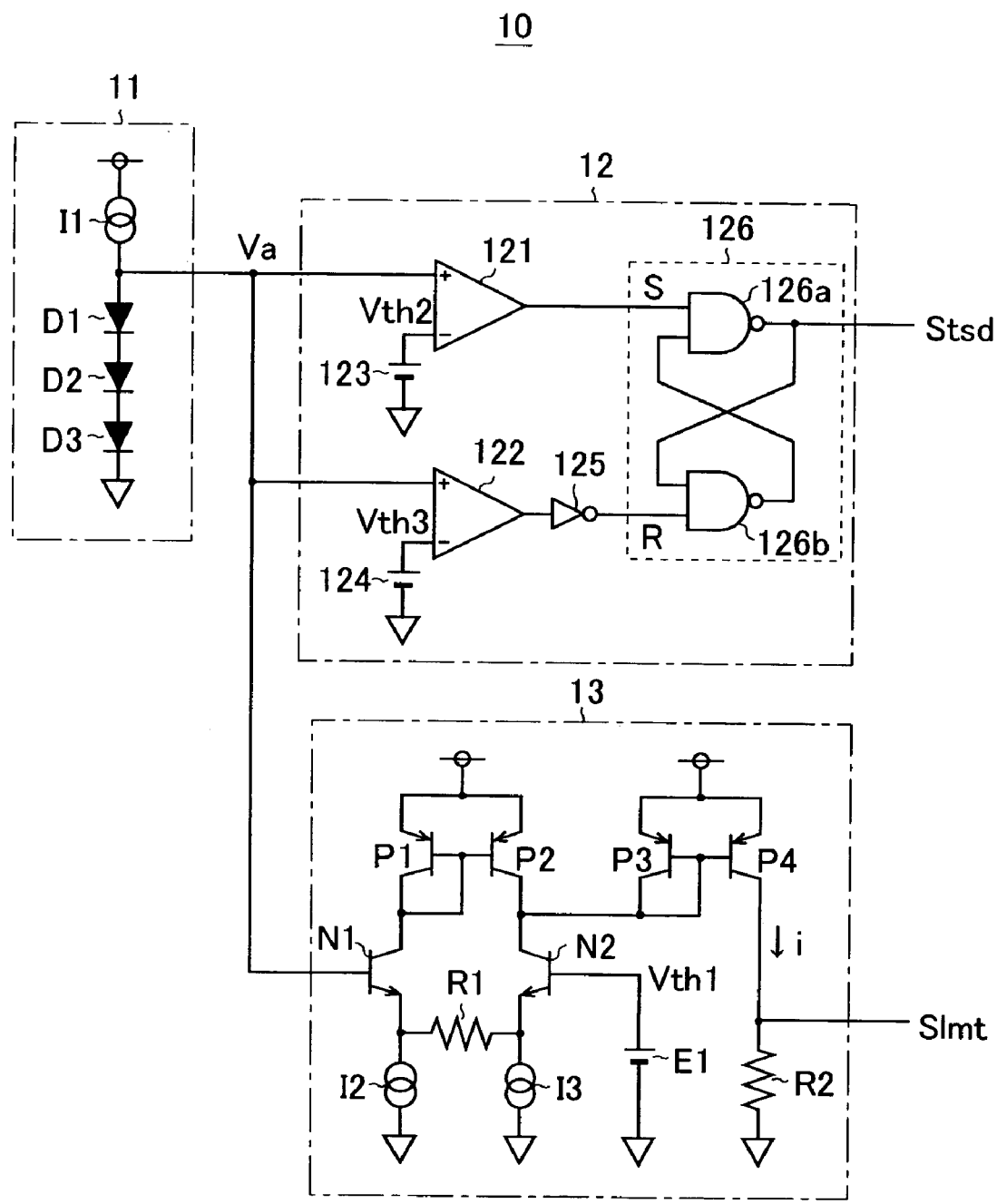
FIG. 5 is a circuit diagram showing one embodiment of a temperature protective circuit 10.

FIG. 5 is a circuit diagram showing one embodiment of a temperature protective circuit 10. As described previously, the temperature protective circuit 10 is configured such that the circuit has as the circuit block thereof the heat generation detecting section 11, the shutting signal producing section 12, and the limiting signal producing section 13.

The heat generation detecting section 11 is configured such that the section has a constant current source I1 and diodes D1 through D3.

One end of the constant current source I1 is connected to a supply voltage application terminal, and the other end thereof is connected to the anode (equivalent to an output terminal of the heat generation detecting section 11 for drawing a voltage signal Va) of the diode D1. The cathode of the diode D1 is connected to the anode of the diode D2, and the cathode of the diode D2 is connected to the anode of the diode D3. The cathode of the diode D3 is grounded.

That is, the heat generation detecting section 11 is configured such that the section draws the voltage signal Va (a voltage signal in which the higher the monitored temperature is, the lower the voltage level thereof becomes) for detecting heat generation, by utilizing the characteristics in that a Vf (a forward drop voltage) of the diodes D1 through D3 fluctuates depending on the ambient temperature (negative temperature characteristics of about −2 mV/°C).

The shutting down signal producing section 12 is configured such that the section has comparators 121, 122, DC voltage sources 123, 124, an inverter 125, and an RS latch 126. Further, the DC voltage source 123 is a means of producing a second threshold voltage Vth2 equivalent to the second threshold temperature Tth2, and the DC voltage source 124 is a means of producing a third threshold voltage Vth3 (higher than Vth2) equivalent to the third threshold temperature Tth3 (lower than Tth2).

A non-inverting input side (+) of the comparator 121 is connected to an output side of the heat generation detecting section 11, and an inverting input side (−) thereof is connected to a positive pole terminal of the DC voltage source 123. A negative pole of the DC voltage source 123 is grounded. An output terminal of the comparator 121 is connected to a set terminal (S) of the RS latch 126. A non-inverting input side (+) of the comparator 122 is connected to the output side of the heat generation detecting section 11, and an inverting input side (−) thereof is connected to a positive pole terminal of the DC voltage source 124. A negative pole of the DC voltage source 124 is grounded. An output terminal of the comparator 122 is connected through the inverter 125 to a reset terminal (R) of the RS latch 126.

The RS latch 126 is constituted from NANDs 126a, 126b. One input terminal of the NAND 126a equivalent to the set terminal (S) of the RS latch 126, as described previously, is connected to the output terminal of the comparator 121. The other input terminal of the NAND 126a is connected to an output terminal of the NAND 126b. The output terminal of the NAND 126a equivalent to an output terminal of the RS latch 126, as an output terminal of the shutting down signal producing section 12, is connected to a shutting signal input terminal of a post-step circuit (the motor drive circuit 20 or other internal circuits), as well as to one input terminal of the NAND 126b. The other input terminal of the NAND 126b equivalent to the reset terminal (R) of the RS latch 126, as described previously, is connected through the inverter 125 to the output terminal of the comparator 122.

The limiting signal producing section 13 is configured such that the section has npn-type bipolar transistors N1, N2, pnp-type bipolar transistors P1 through P4, constant current sources I2, I3, resistors R1, R2 and a DC voltage source E1. Further, the DC voltage source E1 is a means of producing a first threshold voltage Vth1 equivalent to the first threshold temperature Tth1.

The base of the transistor N1 is connected to the output terminal of the heat generation detecting section 11. The collector of the transistor N1 is connected to the collector of the transistor P1. The emitter of the transistor N1 is grounded through the constant current source I2, and also connected to one end of the resister R1. The base of the transistor N2 is connected to the positive pole terminal of the DC voltage source E1. The negative pole terminal of the DC voltage source E1 is grounded. The collector of the transistor N2 is connected to the collector of the transistor P2. The emitter of the transistor N2 is grounded through the constant current source I3, and also connected to the other end of the resister R1. The emitters of the transistors P1, P2 are connected to the supply voltage application terminal. The bases of the transistors P1, P2 are connected to each other, and the connecting node thereof is connected to the collector of the transistor P1. The emitters of the transistors P3, P4 are connected to the supply voltage application terminal. The collector of the transistor P3 is connected to the connecting node of the collector of the transistor P2 and the collector of the transistor P3. The bases of the transistors P3, P4 are connected to each other, and the connecting node thereof is connected to the collector of the transistor P3. The collector of the transistor P4 is grounded through the resistor R2, and also connected to the limiting signal input terminal of a post-step circuit (the motor drive circuit 20) as the output terminal of the limiting signal producing section 13.

The operation of the shutting signal producing section 12 formed of the above-mentioned configuration will be explained in detail. If the monitored temperature does not reach even the third threshold temperature Tth3, the voltage signal Va becomes higher than the second and third threshold voltages Vth2 and Vth3. Therefore, the outputs of the comparators 121, 122 become a high level, so that a high level is inputted into the set terminal (S) of the RS latch 126, while a low level is inputted into the reset terminal (R) thereof As a result, the logic of the shutting down signal Stsd delivered from the output terminal (Q) of the RS latch 126 becomes a low level (a negate state).

When the monitored temperature increases and reaches the third threshold temperature Tth3, the voltage signal Va becomes lower than the third threshold voltage Vth3. Therefore, the output of the comparator 122 is transited to a low level, while a high level is inputted into the reset terminal (R) of the RS latch 126. On the other hand, unless the monitored temperature reaches the second threshold temperature Tth2, the voltage signal Va remains higher than the second threshold voltage Vth2. Therefore, the output of the comparator 121 is maintained a high level, while a low level is inputted continuously into the set terminal (S) of the RS latch 126. As a result, the logic of the shutting down signal Stsd is maintained in the previous low level (a negate state).

When the monitored temperature further increases and reaches the second threshold temperature Tth2, the voltage signal Va reaches the second threshold voltage Vth2. Therefore, the output of the comparator 121 is transited to a low level, while a low level is inputted into the set terminal (S) of the RS latch 126. As a result, the logic of the shutting down signal Stsd is transited to a high level (an assert state).

With the result that the assert of the shutting down signal Stsd caused the drive of the principal IC section to be shut down, when the monitored temperature becomes lower than the second threshold temperature Tth2, the voltage signal Va becomes higher than the second threshold voltage Vth2. Therefore, the output of the comparator 121 is transited to a high level, while a high level is inputted into the set terminal (S) of the RS latch 126. On the other hand, unless the monitored temperature reaches the third threshold temperature Tth3, the voltage signal Va remains lower than the third threshold voltage Vth3. Therefore, the output of the comparator 122 is maintained a low level, while a high level is inputted continuously into the reset terminal (R) of the RS latch 126. As a result, the logic of the shutting down signal Stsd is maintained in the previous high level (the assert state).

When the monitored temperature further decreases and becomes lower than the third threshold temperature Tth3, the voltage signal Va becomes higher than the third threshold voltage Vth3. Therefore, the outputs of the comparators 121, 122 become a high level, while a high level is inputted into the set terminal (S) of the RS latch 126, and a low level is inputted into the reset terminal (R) thereof. As a result, the logic of the shutting down signal Stsd is reset to the low level (the negate state).

Next, the operation of the limiting signal producing section 13 formed of the above-mentioned configuration will be explained. Since the voltage signal Va is higher than the first threshold voltage Vth1 until the monitored temperature reaches the first threshold temperature Tth1, a state occurs in which little output current i flows through the collector of the transistor P4. On the other hand, after the monitored temperature increases and reaches the first threshold temperature Tth1, the voltage signal Va in association with the temperature rise becomes gradually lower than the first threshold voltage Vth1. Therefore, the output voltage i in association with the monitored temperature becomes gradually large.

Figure 7:
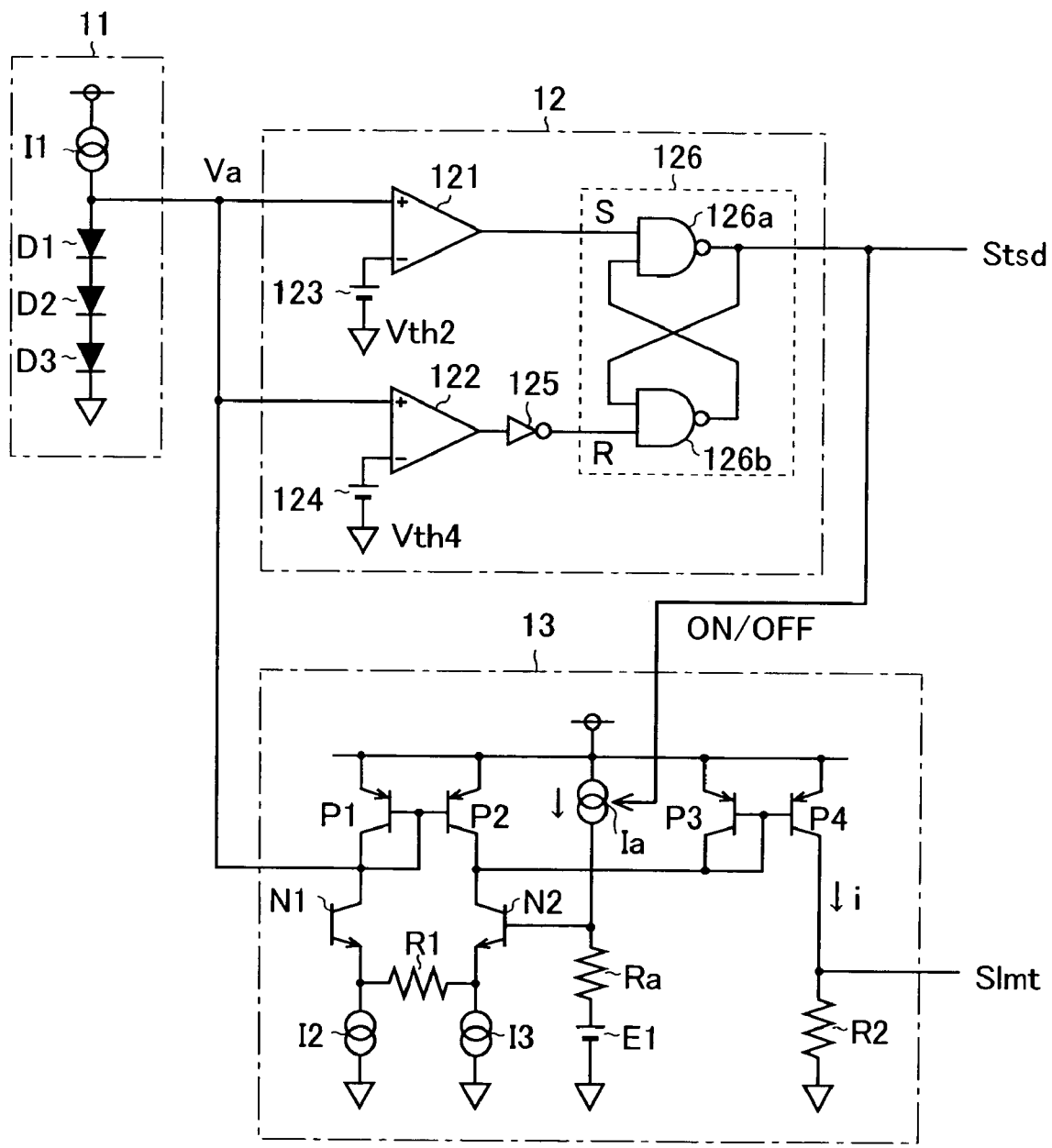
FIG. 7 is a block diagram showing another embodiment of the temperature protective circuit 10.

That is, the limiting signal producing section 13 formed of the above-mentioned configuration functions as a gm amplifier for outputting the output current i (or a voltage signal obtained by voltage converting the output current i concerned with the resistor R2) as the previously-described limiting signal Slmt. The drive current control or torque control (PWM duty control) of the motor drive circuit 20 is performed by the use of the limiting signal Slmt obtained in such a limiting signal producing section 13, whereby the preliminary temperature protective operation shown in the previous FIGS. 2 and 4 can be easily realized. On the other hand, the preliminary temperature protective operation shown in the previous FIG. 3 can be realized by adopting, instead of the configuration shown in FIG. 5, the configuration shown in FIG. 7.

Further, while in the above-mentioned embodiment, a case where the present invention is applied to the motor drive IC has been explained by way of example, the present invention is not limited thereto, but can be applied to other semiconductor integrated-circuit devices such as switching power ICs.

In addition, the configuration of the present invention may be that of embodiments to which various changes are added without departing from the purpose of the present invention, other than the above-mentioned embodiment.

For example, while the above-mentioned embodiment explained by way of example a configuration in which the shutting down signal producing section 12 and the limiting signal producing section 13 use the single heat generation detecting section 11 as a common, the configuration of the present invention is not limited thereto, but may be a configuration in which a plurality of heat generation detecting sections are provided, and when various monitored temperatures all reach the second threshold temperature Tth2, the drive of the motor drive circuit 20 is shut down.

Figure 6:
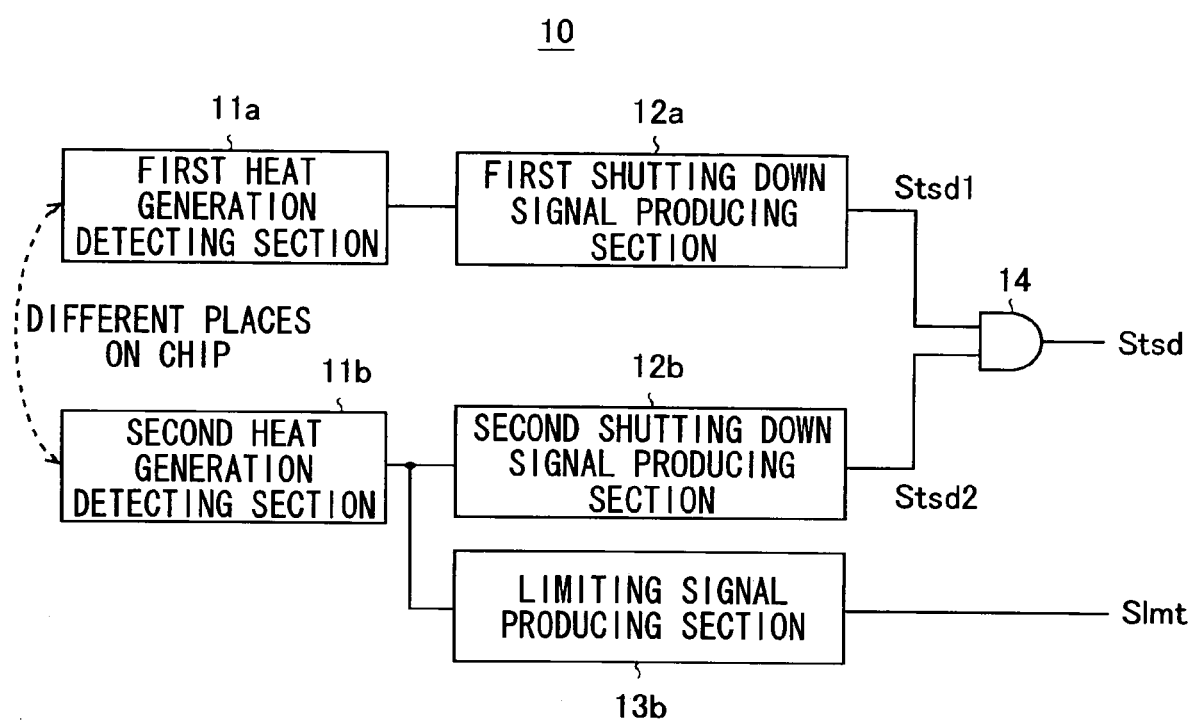
FIG. 6 is a block diagram showing another embodiment of the temperature protective circuit 10.

Describing more specifically, as shown in FIG. 6, there may be a configuration such that it has a first, a second heat generation detecting sections 11a, 11b arranged in different places on the chip; a first shutting down signal producing section 12a for producing a first shutting down signal Stsd1 based on the monitored temperature in the first heat generation detecting section 11a; a second shutting down signal producing section 12b for producing a second shutting down signal Stsd2 based on the monitored temperature in the second heat generation detecting section 11b; a limiting signal producing section 13b for the limiting signal Slmt based also on the monitored temperature in the second heat generation detecting section 11b; and a logical-product arithmetic unit 14 for sending the logical product of the first, the second shutting signals Stsd1, Stsd2 as the shutting signal Stsd to a post step circuit (the motor drive circuit 20 or other internal circuits). With such a configuration, the malfunction of the temperature detecting means can be avoided, thereby realizing a more accurate temperature protective operation. Further, when three of more heat generation detecting sections and the shutting down signal producing sections are provided, a majority circuit may be used in place of the above-mentioned logical-product arithmetic unit.

With respect to the industrial applicability of the present invention, the present invention is a useful technology for enhancing the safety of the semiconductor integrated-circuit unit against abnormal heat generation, and can be suitably utilized, for example, for a switching power unit or a motor drive unit formed by containing a power transistor in an IC (particularly, for applications in which a somewhat drop of the motor revolution speed causes no trouble, such as a washing machine or an electric fan).

As described above, according to the present invention, an abnormal heat generation of a subject of overheat monitoring can be previously limited to perform a more safely temperature protective operation, and in addition, to achieve an improved reliability of a semiconductor integrated-circuit unit.

What is claimed is:

1. A semiconductor integrated-circuit unit comprising:
   a temperature protective circuit for detecting an abnormal heat generation of the unit to perform a temperature protective operation, wherein said temperature protective circuit includes:
   a heat generation detecting section for detecting a monitored temperature;
   a limiting signal producing section for limiting continuously or stepwise the drive of a load according to said monitored temperature such that, the higher said monitored temperature, the more the drive of the load is limited and such that, the lower said monitored temperature, the less the drive of the load is limited, after said monitored temperature exceeds a first threshold temperature, based on the detected results of said heat generation detecting section; and
   a shutting down signal producing section for shutting down the drive of said load when said monitored temperature reaches a second threshold temperature higher than the first threshold temperature, based on the detected results of said heat generation detecting section, wherein the shutting down signal producing section restarts the drive of said load when said monitored temperature reaches a third threshold temperature lower than the second threshold temperature, after the drive of said load is shut down, wherein said limiting signal producing section enhances continuously or stepwise the drive of said load according to said monitored temperature, after said monitored temperature becomes lower than the third threshold temperature.

2. A semiconductor integrated-circuit unit comprising a temperature protective circuit for detecting an abnormal heat generation of the unit to perform a temperature protective operation,
   wherein said temperature protective circuit includes:
   a heat generation detecting section for detecting a monitored temperature;
   a limiting signal producing section for applying a feedback to the drive control of said load to maintain the temperature after said monitored temperature reaches a first threshold temperature, based on the detected results of said heat generation detecting section; and
   a shutting down signal producing section for shutting down the drive of said load when said monitored temperature reaches a second threshold temperature higher that the first threshold temperature, based on the detected results of said heat generation detecting section
     wherein said shutting down signal producing section is arranged to restart the drive of said load when said monitored temperature reaches a third threshold temperature lower than the second threshold temperature, after the drive of said load is shut down, and
     wherein said limiting signal producing section is arranged to enhance continuously or stepwise the drive of said load according to said monitored temperature, after said monitored temperature becomes lower than the third threshold temperature.

3. A semiconductor integrated-circuit unit according to claim 2, wherein said load is a power transistor subject to a switching control.

4. A semiconductor integrated-circuit unit according to claim 3, wherein said power transistor has the drive current or PWM duty thereof controlled, based on the output of said temperature protective circuit.

5. A semiconductor integrated-circuit unit according to claim 3, wherein said power transistor constitutes a motor drive circuit or a switching power circuit.

6. A semiconductor integrated-circuit unit comprising a temperature protective circuit for detecting an abnormal heat generation of the unit to perform a temperature protective operation, wherein said temperature protective circuit includes:
   a plurality of heat generation detecting sections for detecting a plurality of monitored temperatures, respectively;
   a limiting signal producing section for producing, based on a detected result of one of the plurality of heat generation detecting sections, a limiting signal so as to limit continuously or stepwise the drive of a load according to the monitored temperature, after the monitored temperature exceeds a first threshold temperature;
   a plurality of shutting down signal producing sections for producing respective shutting down signals so as to shut down the drive of said load when respective monitored temperatures reach a second threshold temperature higher than the first threshold temperature, based on respective detected results of said plurality of heat generation detecting sections;
   a gate section for performing the logic-product operation or majority operation of said plurality of shutting down signals to send the operation results as a final shutting signal to the load,
   wherein said gate section shuts down the drive of said load when said plurality of monitored temperatures reach the second threshold temperature.

7. A semiconductor integrated-circuit unit according to claim 6, wherein said plurality of shutting down signal producing sections reset respective shutting down signals to a logic state at normal time when said monitored temperature reaches a third threshold temperature lower than the second threshold temperature, after the drive of said load is shut down.

8. A semiconductor integrated-circuit unit according to claim 7, wherein said limiting signal producing section enhances continuously or stepwise the drive of said load according to said monitored temperature, after said monitored temperature becomes lower than the third threshold temperature.

9. A semiconductor integrated-circuit unit according to claim 6, wherein said load is a power transistor subject to a switching control.

10. A semiconductor integrated-circuit unit according to claim 9, wherein said power transistor has the drive current or PWM duty thereof controlled, based on the output of said temperature protective circuit.

11. A semiconductor integrated-circuit unit according to claim 9, wherein said power transistor constitutes a motor drive circuit or a switching power circuit.

* * * * *